United States Patent
Cuenot

(10) Patent No.: US 7,706,697 B2
(45) Date of Patent: Apr. 27, 2010

(54) OPTICAL SIGNAL REGENERATION DEVICE AND CORRESPONDING METHOD

(75) Inventor: Benjamin Cuenot, Lannion (FR)

(73) Assignee: France Telecom, Paris (FR)

( * ) Notice: Subject to any disclaimer, the term of this patent is extended or adjusted under 35 U.S.C. 154(b) by 748 days.

(21) Appl. No.: 10/926,790

(22) Filed: Aug. 26, 2004

(65) Prior Publication Data
US 2005/0047800 A1 Mar. 3, 2005

(30) Foreign Application Priority Data
Aug. 28, 2003 (FR) .................................. 03 10263

(51) Int. Cl.
*H04B 10/00* (2006.01)
(52) U.S. Cl. ................ 398/208; 398/159; 398/147
(58) Field of Classification Search ......... 398/173–181, 398/202–214
See application file for complete search history.

(56) References Cited

U.S. PATENT DOCUMENTS 5,532,861 A * 7/1996 Pirio et al. ................. 398/149

6,366,728 B1 * 4/2002 Way et al. .................. 385/123

FOREIGN PATENT DOCUMENTS

FR 2 776 131 9/1999

OTHER PUBLICATIONS

Liu, X. et al., "improved Transmission Performance in Differential Phase-Shifted-Keyed Systems by Use of Lumped Nonlinear Phase-shift Compensation", Optical Letters, Optical Society of America, Washington, US, vol. 27, No. 18, Sep. 15, 2002, pp. 1616-1618.
Banjerjee, S. et al., "Long-haul 64x40 Gbit/s DWDM Transmission over Commerical Fibre types with Large Operating Margins," Electronics Letters, IEE, GB, vol. 39, No. 1, pp. 92-94, Jan. 9, 2003.

* cited by examiner

*Primary Examiner*—Agustin Bello
(74) *Attorney, Agent, or Firm*—Oliff & Berridge, PLC

(57) ABSTRACT

The invention relates in particular to an optical regeneration device for a signal carrying an item of information encoded by phase modulation of that signal, that signal being transmitted over an optical network and comprising a temporal succession of optical pulses.

Figure 1:
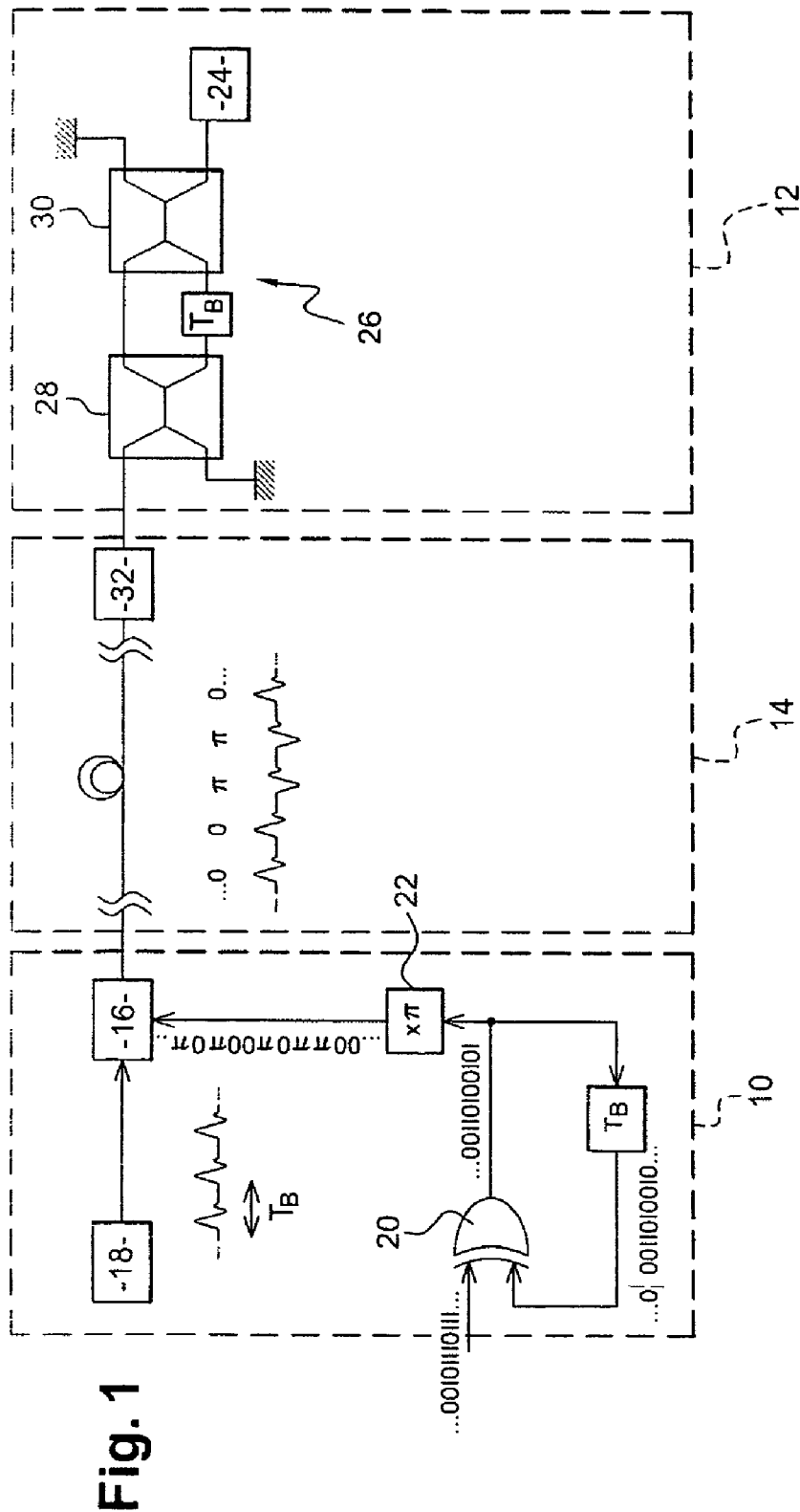

The device comprises an optical pulse nonlinear phase shift module, a linear pulse broadening module a linear pulse broadening module, and a module for the linear compensation of the broadening undergone by the pulses in the linear broadening module.

8 Claims, 1 Drawing Sheet

OPTICAL SIGNAL REGENERATION DEVICE AND CORRESPONDING METHOD

The present invention relates to an optical regeneration device for a signal carrying an item of information encoded by phase modulation of that signal. The invention also relates to a corresponding regeneration method.

More precisely, the invention relates to an optical regeneration device for a signal carrying an item of information encoded by phase modulation of that signal, that signal being transmitted over an optical network and comprising a temporal succession of optical pulses.

When a signal is transmitted in an optical fibre, it undergoes a certain number of distortions, for example distortions of amplitude, of frequency or of phase. To retrieve a signal as similar as possible to the signal sent, it is then necessary to install a device to regenerate the signal at the output of the optical fibre.

In the state of the art, devices for the optical regeneration of signal amplitude are already known, such as saturable absorbers for example.

Current optical transmission devices, used to obtain bit rates of 40 Gbit/s or more, are increasingly being used for phase modulated signals, particularly by modulations of the RZ-DPSK (Differential Phase Shift Keying) type. In this type of modulation, the information is encoded in the phase of the signals: for example a "1" bit is encoded by a phase inversion of the carrier signal and a "0" by an absence of change of phase.

Current optical regeneration devices do not allow a correct regeneration of the signals carrying an item of information encoded by phase modulation since they act only on the amplitude of the signals. Consequently, the phase distortion of the signals that corrupts the information they transport cannot be suppressed or at least reduced.

The aim of the invention is to propose a signal regeneration device allowing the regeneration of the signals carrying an item of information encoded by modulation of their phase.

So the subject of the invention is an optical regeneration device as previously described, characterized in that it comprises an optical pulse nonlinear phase shift module, this phase shift module comprising a nondispersive and nonlinear optical propagation medium parametrized so as to compensate for the effect of the transmission of the signal in the optical network, induced on the phase difference between successive pulses.

When several successive pulses are transmitted in a nonlinear medium, it is observed that nonlinear interactions between successive pulses provoke phase distortions of those pulses.

To reduce the effect of these phase distortions undergone by the signal transmitted in the optical network, a device according to the invention uses a nonlinear phase shift module allowing the interactions between successive pulses to be recreated. The interactions between successive pulses then become such that the phase distortions that they induce compensate for those undergone by the pulses during their transmission in the optical network.

A device according to the invention is therefore used to regenerate the phases of the pulses of a signal of which the item of information it transports is encoded by phase modulation.

According to an advantageous embodiment, the device may comprise a pulse linear broadening module situated in the operating chain before the phase shift module, this broadening module comprising a dispersive and linear optical propagation medium, and a module for the linear compensation of the broadening undergone by the pulses in the linear broadening module, situated in the operating chain after the phase shift module, this linear compensation module comprising a dispersive and linear optical propagation medium.

Specifically, the distortions due to the interactions between adjacent pulses are more sensitive to the nonlinearity of the medium when the pulses are temporally close together and/or broadened.

The linear broadening module which increases the temporal width of the pulses is used to increase the sensitivity and effectiveness of the phase shift module.

The linear compensation module, after having regenerated the phase of the signal, is used to restore the initial pulse widths.

Optionally, the regeneration device may comprise an optical amplifier situated in the operating chain before the phase shift module.

This amplifier allows the signal to achieve a sufficient optical power to propagate itself in the phase shift module.

For the broadening module to operate in a linear manner, it is preferable that the injected optical power is relatively low. It is therefore advisable to place the optical amplifier between the broadening module and the phase shift module while undergoing the nonlinear effects.

An optical regeneration device according to the invention may also comprise one or more of the following features:
  the device comprises an optical attenuator situated in the operating chain after the phase shift module;
  the device comprises amplitude regeneration means, such as a saturable absorber.

Another subject of the invention is an optical regeneration method for a signal carrying an item of information encoded by phase modulation of that signal, that signal being transmitted over an optical network and comprising a temporal succession of optical pulses, characterized in that it comprises an optical pulse nonlinear phase shift step, in a phase shift module comprising a nondispersive and nonlinear optical propagation medium parametrized so as to compensate for the effect of the transmission of the signal in the optical network, induced on the phase difference between successive pulses.

An optical regeneration method according to the invention may also comprise one or more of the following features:
  the method comprises a step of linear broadening of the pulses carried out before the phase shift step by a pulse linear broadening module comprising a dispersive and linear optical propagation medium and a step of linear compensation of the broadening undergone by the pulses during the linear broadening step, this step being performed after the phase shift step by a pulse linear compensation module comprising a dispersive and linear optical propagation medium;
  the signal is amplified before it enters the phase shift module;
  the signal is attenuated after leaving the phase shift module.

Figure 2:
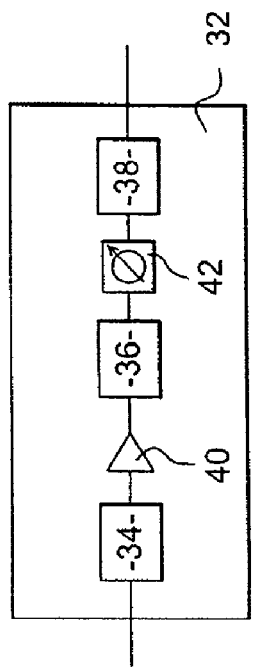

The invention will be better understood on reading the following description, given only as an example and made with reference to the appended drawings in which:

FIG. 1 schematically represents the general structure of an optical pulse transmission installation comprising an optical regeneration device according to the invention; and FIG. 2 illustrates a detailed representation of the optical regeneration device in FIG. 1.

FIG. 1 shows an installation for the optical transmission of a signal carrying an item of information encoded by phase modulation of that signal.

This installation comprises a transmission device 10, a reception device 12 and an optical network 14 for transmitting the signal. In the embodiment shown, the optical network consists of an optical fibre 14 of conventional type.

The information to be transmitted from the transmission device 10 to the reception device 12 is in binary code.

Take for example the sequence " . . . 00101110111 . . . ". To allow its transmission in the optical fibre 14, the phase of an optical signal is modulated so that it is the carrier of the item of information to be transmitted.

For this, the transmission device 10 comprises an optical pulse generator 18. The transmission device 10 also comprises a phase modulator 16. This phase modulator 16 receives at the input the optical pulses supplied by the generator 18, and a sequence of phase values of these pulses determined from the sequence " . . . 00101110111 . . . ".

The pulses are spaced out in periods $T_B$ that are called "bit time" and all have the same frequency spectrum.

The phase modulator 16 supplies optical pulses at the output at the same frequency as the input pulses, but whose phases are carriers of the item of information.

In the chosen embodiment, an RZ-DPSK modulation is used: a "1" bit is encoded by a phase inversion of the carrier signal and a "0" by an absence of change of phase. Thus, the sequence " . . . 00101110111 . . . " will be encoded by the following succession of phase values: " . . . 00π π 0π 00π 0π . . . ".

To obtain automatically this succession of phase values from the initial sequence, an "exclusive OR" logic gate 20, usually called an XOR logic gate is used. The two input variables of this logic gate are the binary data to be transmitted " . . . 00101110111 . . . " and the binary data obtained at the output of this gate after having undergone a delay of one bit time. On initialization, it is considered that the output is 0. The bit sequence obtained at the output of the logic gate 20 is then: " . . . 00110100101 . . . ".

This bit sequence is then sent in a component 22 which multiplies the bit sequence by π which becomes: " . . . 00π π 0π 00π 0π . . . ". So a sequence of phases of value 0 or π is then obtained, this sequence being supplied at the input of the phase modulator 16.

The modulated pulses are then transmitted in the optical fibre 14 to the reception device 12.

Note as $E_{gaussian}(t)$ the general equation of an optical pulse supplied by the generator 18. This pulse is for example a gaussian envelope pulse.

Each pulse transmitted is equal to this gaussian pulse, apart from the phase noted as φ(n) and from the temporal shift. The nth pulse, received at the moment $nT_B$ by the reception device 12 is therefore written as:

$$E_n(t) = E_{gaussian}(t-nT_B)e^{i\phi(n)}.$$

The value of the phase φ(n) of the nth pulse is given by the nth value of the sequence of phases.

The reception device 12 comprises an optical detector 24 which is sensitive to the intensity of the optical signals and not to their phase. Consequently, by using 3 dB couplers a modulation changing device 26 is created allowing the phase modulated signal to be converted into an amplitude modulated signal.

This modulation changing device 26 works as follows: the pulses initially pass into a first coupler 28 in order to obtain two identical pulse sequences. One of the two sequences is then temporally delayed by one bit time $T_B$. Then, the two sequences are added together in a second coupler 30 which produces the sum between two successive pulses:

$$E_{final}(t) = E_n(t) + E_{n-1}(t-T_B).$$

Which, by developing this equation, gives:

$$E_{final}(t) = E_{gaussian}(t-nT_B)e^{i\phi(n)} + E_{gaussian}(t-T_B-(n-1)T_B)e^{i\phi(n-1)}$$

$$E_{final}(t) = E_{gaussian}(t-nT_B)e^{i\phi(n)} + E_{gaussian}(t-nT_B)e^{i\phi(n-1)}$$

$$E_{final}(t) = E_{gaussian}(t-nT_B)e^{i\phi(n)} + e^{i\phi(n-1)}.$$

When φ(n)=φ(n−1), that is to say when the two successive pulses have the same phase, the final signal $E_{final}$ is $2E_{gaussian}(t-nT_B)e^{i\phi(n)}$. It is not zero, so the power sensed by the optical detector 24 is not zero. This corresponds to the case where the nth pulse carries the binary information "0".

When φ(n)=φ(n−1)+π, that is to say when the two successive signals are in phase opposition, the final signal $E_{final}$ is zero, so the power sensed by the optical detector 24 is zero. This corresponds to the case where the nth pulse carries the binary information "1".

This modulation changing device is therefore effectively used to convert the phase modulated signal into an amplitude modulated signal.

The optical detector 24 interprets the final amplitude modulated signal and is used to restore the original bit sequence.

Optical fibres are not however perfect. During transmission, a phase noise disrupts the optical signal. Because of this phase noise, the values of the phase differences of the pulses are not precisely 0 or π, but noised values close to 0 or π.

Consequently, neither of the two equations φ(n)=φ(n−1) and φ(n)=φ(n−1)+π is verified after the signal has passed into the second converter 30 and the difference between the minimal value and the maximal value of the signal $E_{final}$ is less than in the case of an ideal transmission.

It is therefore more difficult for the optical detector 24 to differentiate between the "0" bits and the "1" bits and its detection error rate increases.

To reduce the error rate during decoding, a device 32 for regenerating the phase of the pulses is placed at the end of the optical fibre 14 before the reception device 12. This pulse phase regeneration device is used to obtain pulses whose phase shifts are again approximately 0 or π. It will be detailed for reference in FIG. 2.

A known model is used to obtain the equation of the evolution of a gaussian pulse during its transmission in an optical fibre, as a function of certain parameters:

$$f(X_1, X_2, X_3, X_4, X_5, X_6, t) = X_1 e^{\frac{-(t-X_2)^2}{X_3^2}} e^{i\left(\frac{X_4}{2}(t-X_2)^2 + X_5(t-X_2)\right)} e^{iX_6}.$$

The parameters of this equation have the following meaning:

$X_1$ represents the amplitude of the pulse;
$X_2$ represents the temporal shift of the pulse;
$X_3$ characterizes its width;
$X_4$ represents a frequency variation of the second order, currently called "chirp", of the pulse;
$X_5$ represents the frequency shift; and
$X_6$ represents the phase shift of the pulse.

In the case of a signal comprising a succession of pulses, it is shown that the phase $X_6$ of any pulse follows more precisely the following differential equation:

$$\dot{X}_6 = \beta_2\left(\frac{1}{X_3^2} - \frac{X_5^2}{2}\right) + \frac{5\gamma X_1^2}{4\sqrt{2}} + 5\frac{\gamma X_3 X_5 \sqrt{\frac{2}{\pi}}}{X_1^2}\mathrm{Re}[K_{d2} + K_{g2}]$$

in which Re[ ] is the real portion function, γ is a coefficient characteristic of the nonlinearity of the optical fibre in which the signal is propagated, and $K_{d2}$ and $K_{g2}$ are factors characteristic of the interactions between adjacent pulses.

The factor $K_{d2}$ characterizes the interactions between the pulse in question and the pulse preceding it, while the factor $K_{g2}$ characterizes the interactions between the pulse in question and the pulse following it. In the first order, these two factors are given by the equations supplied in the annex.

In these equations, the variables have two indices: the first index which varies between 1 and 6 takes the notation previously adopted in the equation of evolution of the gaussian pulses. The second index is 1 when the variable is relative to the pulse in question, and 2 when the variable is relative to the adjacent pulse.

∂(φ) represents the phase difference between the pulse in question and the adjacent pulse.

In these two equations, the terms $X_{32}$ and $X_{31}$ characteristic of the pulse width are seen to appear. When $X_{31}$ and/or $X_{32}$ increase, that is to say when the pulses broaden, the terms $K_{d2}$ and $K_{g2}$ increase, thus favouring the nonlinear interactions between pulses.

The differential equation giving the distortions undergone by the phase comprises the addition of three terms. The first corresponds to the linear effects of the optical fibre, the second to certain nonlinear effects (self-phase modulation) and the third to the nonlinear interactions between adjacent pulses.

The third term reveals that the phase of a pulse is modified by a nonlinear interaction with the adjacent pulses.

The regeneration device according to the invention uses this property to act on the phases of the pulses. In order to increase the sensitivity of the phase variations to the nonlinear interactions, it acts mainly on the parameters connected to the third term. These parameters are notably the parameter γ, the parameter $X_1$ and the parameter $X_3$.

The phase regeneration device 32 is shown in detail in FIG. 2.

It comprises a linear pulse broadening module 34 receiving as an input the pulses transmitted by the optical fibre 14. This broadening module 34 comprises a dispersive and linear optical propagation medium. In practice it may consist of a conventional optical fibre in which the pulses are broadened (parameter $X_3$).

For example, for a bit rate of 160 Gbit/s or of 40 Gbit/s, use is advantageously made of an optical fibre with total dispersion of −2.72 ps/nm or for example 30.2 meters of DCF type optical fibre with dispersion per unit of length of −90 ps/nm/km.

The phase regeneration device 32 also comprises a module 36 for nonlinear phase shift of the pulses broadened by the linear broadening module 34. This phase shift module 36 therefore receives at the input the pulses supplied by the linear broadening module 34. It comprises a nondispersive and nonlinear optical propagation medium intended to compensate for the effect of the transmission of the signal in the optical network, induced on the phase difference between successive pulses.

In practice, this phase shift module 36 consists of an optical fibre with high nonlinearity.

Advantageously, for bit rates of 40 Gbit/s or 160 Gbit/s, use is made of a fibre 2 km long, with zero dispersion at the wavelength in question, with a nonlinear index of 2.6 $10^{-20}$ $m^2 \cdot W^{-1}$ and with a core diameter of 10 μm² in order to increase the nonlinear effects.

The phase regeneration device 32 also comprises a module 38 for linear compensation of the broadening undergone by the pulses in the linear broadening module 34. This linear compensation module 38 comprises a dispersive and linear optical propagation medium. In practice, it consists of a conventional optical fibre with a total dispersion opposite that of the linear broadening module 34, that is to say 2.72 ps/nm. Advantageously, for bit rates of 40 Gbit/s or 160 Gbit/s, use is made of 160 m of an SMF type optical fibre with dispersion per unit of length of 17 ps/nm/km.

Such an optical fibre is used to restore the initial widths of the pulses supplied by the optical fibre 14.

To increase the nonlinear effects of the phase shift module 36, an optical amplifier 40 allowing the pulses to achieve a sufficient power may be placed between the linear broadening module 34 and the phase shift module 36.

In this case, an attenuator 42 can then also be placed between the phase shift module 36 and the compensation module 38 in order to reduce the power of the pulses, such that they do not undergo nonlinear distortion when they are propagated in the compensation module 38.

Advantageously, an optical amplifier with an output power of 13.5 dBm at 160 Gbit/s and an optical amplifier with an output power of 16.5 dBm at 40 Gbit/s are used. Likewise, an attenuator of 15 dB at 40 Gbit/s or at 160 Gbit/s is preferably used.

The presence of the regeneration device 32 is used to improve the error rate at the output of the reception device 12.

Thus, a computer simulation of the installation described above with the parameters indicated shows that this installation can be used to improve the quality factor $Q^2$ measuring the error rate at the output of the installation:

by approximately 2.5 dB at 160 Gbit/s when in the region of $Q^2$=16 dB; and of approximately 3.05 dB at 40 Gbit/s in the region of $Q^2$=16 dB.

It is apparent that an optical regeneration device according to the invention can be used to compensate for the phase shifts undergone by pulses being propagated in an optical fibre. By varying the parameters of pulse width ($X_3$), thanks to a linear broadening module on the one hand, by varying the pulse amplitude ($X_1$), thanks to the presence of an amplifier 40, and by varying γ, thanks to the presence of the phase shift module 36, the optical regeneration device 32 can be set up so that these nonlinearity effects reduce, or even compensate for the effect of the transmission of the signal in the optical network 14.

Naturally, the invention is not limited to the embodiment described above.

Specifically, the regeneration device 32 described above can be used for example as an addition to another regeneration device, for example one for amplitude regeneration, such as a saturable absorber, in order to further improve the quality of the received signal.

$$Kd_2 = \frac{e^{\left(-\frac{(-X_{21}+Tb-X_{22})^2}{X_{31}^2} - \frac{1}{2}IX_{41}(-X_{21}+Tb-X_{22})^2 - I(-X_{21}+Tb-X_{22})X_{51}\right)} X_{12}^3 X_{11} \sqrt{2} \sqrt{\pi}}{\sqrt{6\frac{1}{X_{32}^2} + 2\frac{1}{X_{31}^2} - I(X_{42}-X_{41})}} e^{\left(-\frac{1}{2}\frac{\left(2\frac{I(-X_{21}+Tb-X_{22})}{X_{31}^2} - X_{41}(-X_{21}+Tb-X_{22})+X_{52}+X_{51}\right)^2}{6\frac{1}{X_{32}^2}+2\frac{1}{X_{31}^2}-I(X_{42}-X_{41})}\right)} e^{(-f\varepsilon(\phi))}$$

$$Kg_2 = \frac{e^{\left(-\frac{(-X_{22}-X_{21})^2}{X_{31}^2} - \frac{1}{2}IX_{41}(-X_{22}-X_{21})^2 - I(-X_{22}-X_{21})X_{51}\right)} X_{12}^4 \sqrt{2} \sqrt{\pi}}{\sqrt{6\frac{1}{X_{32}^2} + 2\frac{1}{X_{31}^2} - I(X_{42}-X_{41})}} e^{\left(-\frac{1}{2}\frac{\left(2\frac{I(-X_{22}-X_{21})}{X_{31}^2} - X_{41}(-X_{22}-X_{21})+X_{51}+X_{52}\right)^2}{6\frac{1}{X_{32}^2}+2\frac{1}{X_{31}^2}-I(X_{42}-X_{41})}\right)} e^{(-f\varepsilon(\phi))}$$

The invention claimed is:

1. An installation comprising an optical regeneration device for a signal carrying an item of information encoded by phase modulation of the signal and comprising a temporal succession of optical pulses, said installation comprising:
   an optical network inducing a first phase difference between two successive optical pulses having an initial width;
   means for compensating said phase difference comprising an optical pulse nonlinear phase shift module, the phase shift module comprising a nondispersive and highly nonlinear optical propagation medium and inducing a second phase difference opposite said first phase difference by creating nonlinear interactions between said successive pulses;
   means for linearly broadening said optical pulses from said initial width to a greater width, situated in the operating chain before the phase shift module and comprising a negatively dispersive and linear optical propagation medium; and
   means for compensating the broadening of the optical pulses comprising a module for the linear compensation of the broadening undergone by the pulses in the means for linearly broadening the optical pulses, situated in the operating chain after the phase shift module, the linear compensation module comprising a positively dispersive and linear optical propagation medium and narrowing said optical pulses from the greater width to the initial width.

2. The installation according to claim 1, further comprising an optical amplifier situated in the operating chain before the phase shift module.

3. The installation according to claim 2, further comprising an optical attenuator situated in the operating chain after the phase shift module.

4. The installation according to claim 1, further comprising an amplitude regeneration means comprising a saturable absorber.

5. An optical regeneration method for a signal carrying an item of information encoded by phase modulation of the signal and comprising a temporal succession of optical pulses, said optical regeneration method comprising:
   receiving the signal from an optical network that induces a first phase difference between two successive optical pulses having an initial width;
   an optical pulse nonlinear phase shift step, carried out in means for compensating said phase difference, said means for compensating said phase difference comprising an optical pulse nonlinear phase shift module, the phase shift module comprising a nondispersive and highly nonlinear optical propagation medium and inducing a second phase difference opposite said first phase by creating nonlinear interactions between said successive pulses;
   a step of linear broadening of the optical pulses from said initial width to a greater width, carried out before the phase shift step by means for linearly broadening the optical pulses comprising a negatively dispersive and linear optical propagation medium,
   a step of linear compensation for the broadening undergone by the optical pulses during the linear broadening step, the linear compensation step being performed after the phase shift step by means for compensating the broadening comprising a pulse linear compensation module comprising a positively dispersive and linear optical propagation medium and narrowing said optical pulses from the greater width to the initial width;
   the method comprising a preliminary step of choosing a length and a coefficient characteristic of the nonlinearity of the optical fiber of the nonlinear optical propagation medium of the phase shift module, so as to compensate said phase difference induced by transmission in the optical network, by creating nonlinear interactions between successive pulses.

6. The method of optical regeneration of a signal according to claim 5, wherein the signal is amplified before it enters the phase shift module.

7. The method of optical regeneration of a signal according to claim 6, wherein the signal is attenuated after leaving the phase shift module.

8. An optical pulse transmission installation including an optical regeneration device for the optical transmission of a signal carrying an item of information encoded by phase modulation of the signal and comprising a temporal succession of optical pulses, said optical pulse transmission installation comprising:
   a transmission device;
   an optical network inducing a phase difference between two successive optical pulses having an initial width;
   a reception device, the reception device comprising an optical regeneration device comprising:
      means for compensating said phase difference comprising an optical pulse nonlinear phase shift module, the phase shift module comprising a nondispersive and highly nonlinear optical propagation medium and inducing a second phase difference opposite said first phase difference, by creating nonlinear interactions between said successive pulses,
      means for linearly broadening said optical pulses from said initial width to a greater width, situated in the operating chain before the phase shift module and comprising a negatively dispersive and linear optical propagation medium; and
      means for compensating the broadening of the optical pulses comprising a module for the linear compensation of the broadening undergone by the pulses in the means for linearly broadening the optical pulses, situated in the operating chain after the phase shift module, the linear compensation module comprising a positively dispersive and linear optical propagation medium and narrowing said optical pulses from the greater width to the initial width.

* * * * *